F. JERKA.
HAY SPREADER.
APPLICATION FILED MAR. 15, 1915.
1,169,647.
Patented Jan. 25, 1916.
2 SHEETS—SHEET 1.
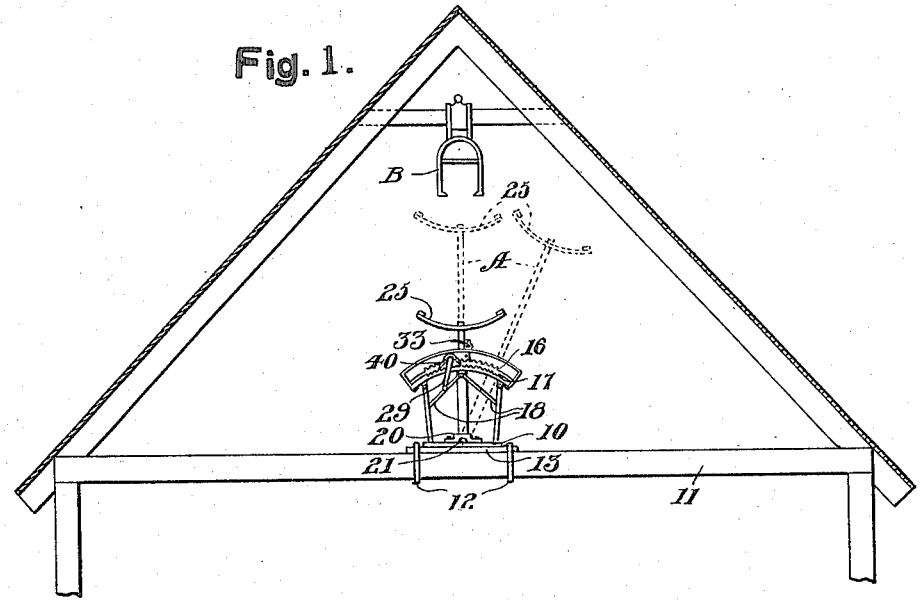
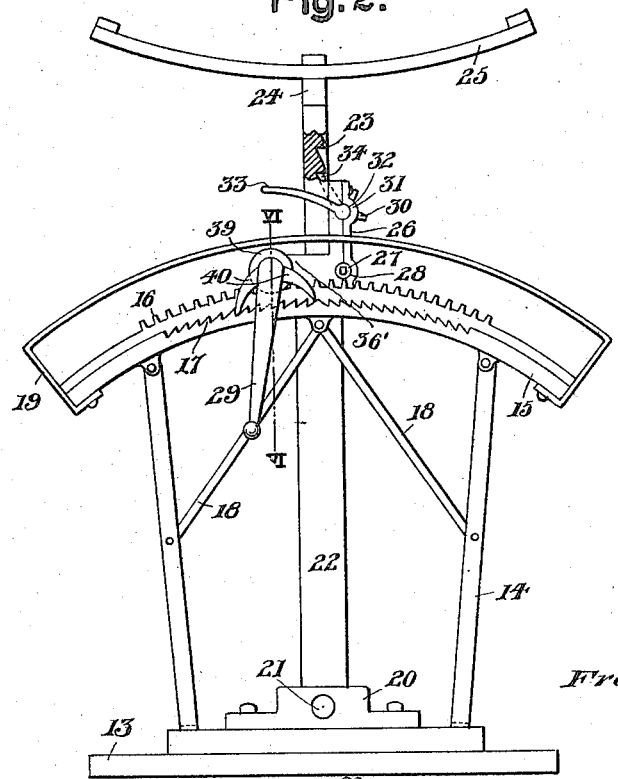
Inventor
Frank Jerka
By
A. M. Wilson
Attorney F. JERKA.
HAY SPREADER.
APPLICATION FILED MAR. 15, 1915.
1,169,647.
Patented Jan. 25, 1916.
2 SHEETS—SHEET 2.
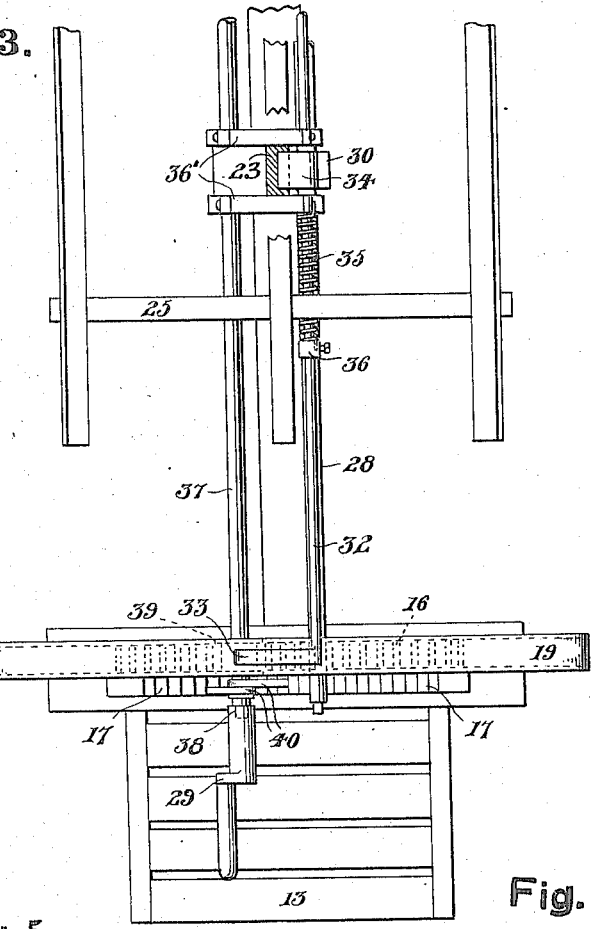
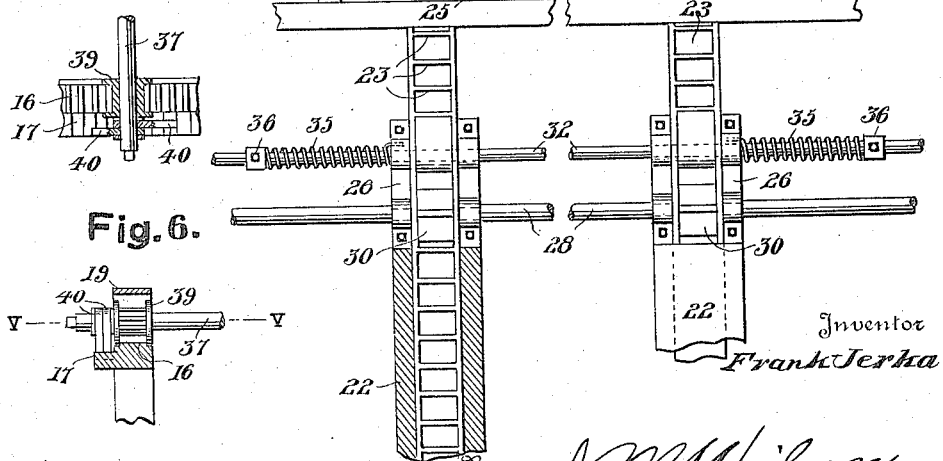
Inventor
Frank Jerka
By A. M. Wilson,
Attorney

UNITED STATES PATENT OFFICE.

FRANK JERKA, OF CHICAGO, ILLINOIS.

HAY-SPREADER.

1,169,647.

Specification of Letters Patent.

Patented Jan. 25, 1916.

Application filed March 15, 1915. Serial No. 14,512.

*To all whom it may concern:*

Be it known that I, FRANK JERKA, a citizen of the United States of America, residing at No. 1350 Augusta street, Chicago, in the county of Cook and State of Illinois, have invented certain new and useful Improvements in Hay-Spreaders, of which the following is a specification.

This invention relates to mechanisms for distributing or spreading hay or straw in a loft after the same has been elevated by one of the usual forms of hay fork or carrier.

One principal object of the invention is to improve and simplify the general construction of devices of this character so that the spreading of the hay may be readily effected on either side of the device and so that the hay may be evenly distributed as the loft is filled.

Another important object of the invention is to provide improved means for distributing hay in the above manner wherein the carrier may be elevated as desired to keep the same above the top of the hay previously distributed.

With the above and other objects in view as will be hereinafter apparent, the invention consists in general of certain novel details of construction and combinations of parts hereinafter fully described, illustrated in the accompanying drawings, and specifically claimed.

In the accompanying drawings, like characters of reference indicate like parts in the several views, and:—Figure 1 is a section through a hay loft showing the device in full and dotted lines in several positions, the view being in a measure diagrammatic. Fig. 2 is an end elevation of the device partly in section. Fig. 3 is a detail plan view partly in section showing the operator's end of the device. Fig. 4 is a detail side view partly broken away and showing the racks and locking dogs, the view being also partly in section. Fig. 5 is a detail section on the line V—V of Fig. 6. Fig. 6 is a detail section on the line VI—VI of Fig. 2.

In carrying out the objects of the invention as disclosed in the present embodiment I provide a base 10 at each end which is intended to be secured to one of the cross beams or truss members 11 of a structure forming a hay loft, bolts or straps 12 being used for the purpose of securely holding the device in position. Supported at one end of the device is an operator's platform 13 which is attached to the base at that end in any convenient manner. Extending upward from each base are bars 14 which serve to support a quadrant 15 whereon is formed a segmental gear 16 and a segmental ratchet 17, the teeth on one side of the central line being inclined in one direction, while the teeth on the opposite side are inclined in the opposite direction as clearly shown in Fig. 2. The bars 14 are securely braced to the quadrant 15 by brace rods 18. A suitable guard 19 is fitted on the quadrant to prevent clogging of the ratchet and rack and also to prevent injury to the operator by his hands being caught in the moving parts of the device.

Mounted on each base is a bearing 20 and supported in these bearings is a shaft 21 which carries upwardly extending housings 22 wherein are slidably mounted the ratchet bars 23. The upper ends of these ratchet bars are connected by a cross beam or bar 24 whereon is supported a hay receiving rack 25. Each of the housings 22 is provided with a bearing 26 and through these bearings 26 extends a shaft 27 having an end 28 polygonal in cross section so that a crank handle 29 may be fitted thereon. On the shaft 27 are mounted gears 30 which engage the ratchet bars 23 for the purpose of raising or lowering the ratchet bars out of and into the housings and thereby regulating the extent of elevation of the hay rack 25. Each housing is furthermore provided with bearings 31 and through these bearings 31 extends a shaft 32 having on one end a crank handle 33 conveniently placed to be grasped by the operator. This shaft 32 carries locking pawls 34 which are normally held in engagement with the ratchet bars 23 by means of springs 35 coiled around the shaft 32 and each having one end secured to one of the bearings 31 while the remaining end is secured to a collar 36 fixedly mounted on the shaft 32. On the sides of the housings opposite the bearings 26 is a third set of bearings 36' wherethrough passes a shaft 37 having the end next to the operator polygonal in cross section as at 38 so that the crank handle 29 may be fitted thereon, this crank being thus suited for positioning either on the shaft 27 or the shaft 37. On this shaft 37 are fixed gears 39 which mesh with the segmental racks 16 so that by rotating the shaft 37 the housings 22, and consequently the rack 25 may be swung from one side to the other of the center of the device, one such position being indicated at A in Fig. 1. In order to retain the rack in its shifted position pawls 40 are loosely mounted on the shaft 37 and engage the ratchet 17, one pawl projecting in one direction and the other in the opposite direction so that no matter to which side the rack may be swung these pawls will serve when engaged with the ratchet to prevent further movement in that direction. It will be obvious that the weight of the apparatus will prevent movement in the direction of the center position.

In operation a suitable load of hay is operated by means of such a fork as is shown at B in Fig. 1 and deposited on the rack 25. At the start of filling the loft the ratchet members 23 are housed in the housings 22 so that the hay rack 25 is close to the bottom of the loft. After the load has been deposited on this hay rack, it is then swung to one side or the other to dump the hay in the desired position, this operation being effected by placing the handle 29 on the shaft 37 and rotating the shaft in the proper direction. As the loft is filled the handle 29 is shifted from time to time to the shaft 27 and the hay rack 25 elevated, it being locked in elevated position by the pawls 34. The same swinging operation is maintained and thus the hay is spread evenly over the entire loft and does not require manipulation with pitch forks to properly fill such loft. There has thus been provided a simple and efficient device of the kind described and for the purpose specified.

Having thus described the invention, what is claimed as new is:—

1. In a hay spreader, a plurality of spaced supports, segmental racks carried by the supports, a shaft journaled concentrically of said racks, housings carried by said shaft, a crank shaft journaled to the upper ends of said housings, gears on said crank shaft meshing with said racks, and a hay rack supported by the housings.

2. In a hay spreader, a plurality of spaced supports, segmental racks carried by the supports, a shaft journaled concentrically of said racks, housings carried by said shaft, a crank shaft journaled to the upper ends of said housings, gears on said crank shaft meshing with said racks, ratchet bars slidable into and out of said housings, a hay rack carried by the upper ends of the ratchet bars, and means to elevate the ratchet bars.

3. In a hay spreader, a plurality of spaced supports, segmental racks carried by the supports, a shaft journaled concentrically of said racks, housings carried by said shaft, a crank shaft journaled to the upper ends of said housings, gears on said crank shaft meshing with said racks, ratchet bars slidable into and out of said housings, a hay rack carried by the upper ends of the ratchet bars, a second crank shaft journaled adjacent the upper ends of the housings, gears on the second crank shaft meshing with the ratchet bars, and pawls carried by the housings and engaging the ratchet bars.

4. In a hay spreader, a plurality of spaced supports, segmental racks carried by the supports, a shaft journaled concentrically of said racks, housings carried by said shaft, a crank shaft journaled to the upper ends of said housings, gears on said crank shaft meshing with said racks, ratchet bars slidable into and out of said housings, a hay rack carried by the upper ends of the ratchet bars, a second crank shaft journaled adjacent the upper ends of the housings, gears on the second crank shaft meshing with the ratchet bars, pawls carried by the housings and engaging the ratchet bars, other pawls on the first crank shaft, and a segmental ratchet carried by one of said supports and engageable by the last mentioned pawls, the teeth on one side of the center of the ratchet being inclined in one direction and the teeth on the opposite side of said center being inclined in the opposite direction.

FRANK JERKA.

Witnesses:
ANTON A. TOCHA,
ANTHONY A. KOWALSKI.